United States Patent [19]

Nagase et al.

[11] 4,052,109
[45] Oct. 4, 1977

[54] AIR BRAKE SYSTEM EMPLOYING COMBINED AUTOMATIC AND DIRECT BRAKING

[75] Inventors: Kazuhiko Nagase, Tokyo; Michihiko Takakubo, Yono, both of Japan

[73] Assignee: Japanese National Railways, Tokyo, Japan

[21] Appl. No.: 688,075

[22] Filed: May 19, 1976

[30] Foreign Application Priority Data

June 4, 1975 Japan .................................. 50-66571

[51] Int. Cl.² .............................................. B60T 13/62
[52] U.S. Cl. ........................................ 303/25; 303/3; 303/7; 303/15
[58] Field of Search ................. 303/2, 3, 15, 25, 7, 303/8, 26, 86

[56] References Cited

U.S. PATENT DOCUMENTS

| 1,879,678 | 9/1932 | Good ...................... 303/15 |
| 2,040,312 | 5/1936 | Ickes et al. ............... 303/15 |
| 2,058,008 | 10/1936 | Farmer ................... 303/15 X |
| 2,136,577 | 11/1938 | Campbell ................. 303/15 |
| 3,456,988 | 7/1969 | Gibbons et al. ............ 303/2 |
| 3,584,214 | 6/1971 | Peterson ................ 303/15 X |
| 3,819,238 | 6/1974 | Cermak ................. 303/15 X |
| 3,887,239 | 6/1975 | Engle .................... 303/3 X |

FOREIGN PATENT DOCUMENTS

| 176,231 | 3/1953 | Austria ................... 303/15 |
| 317,203 | 2/1903 | France ................... 303/15 |
| 456,545 | 8/1913 | France ................... 303/15 |

*Primary Examiner*—Trygve M. Blix
*Assistant Examiner*—Edward R. Kazenske
*Attorney, Agent, or Firm*—Wenderoth, Lind & Ponack

[57] ABSTRACT

An air brake system for a vehicle includes both automatic braking and direct braking. The equipment for direct braking requires the installation of a main air reservoir pipe in the longitudinal direction of a train. A single pipe serves both as the brake pipe for automatic braking and as the main air reservoir pipe for direct braking. A control valve for automatic braking is connected to the air pipe via a pressure-adjust valve for adjusting the pressure of the air supplied to the control valve to a specified value, and via a check valve arranged parallel thereto. An air pipe supplying the pressure from the control valve to the brake cylinder and an air pipe supplying the pressure from the direct brake equipment to the brake cylinder are respectively connected to the brake cylinder via a double check valve.

4 Claims, 6 Drawing Figures

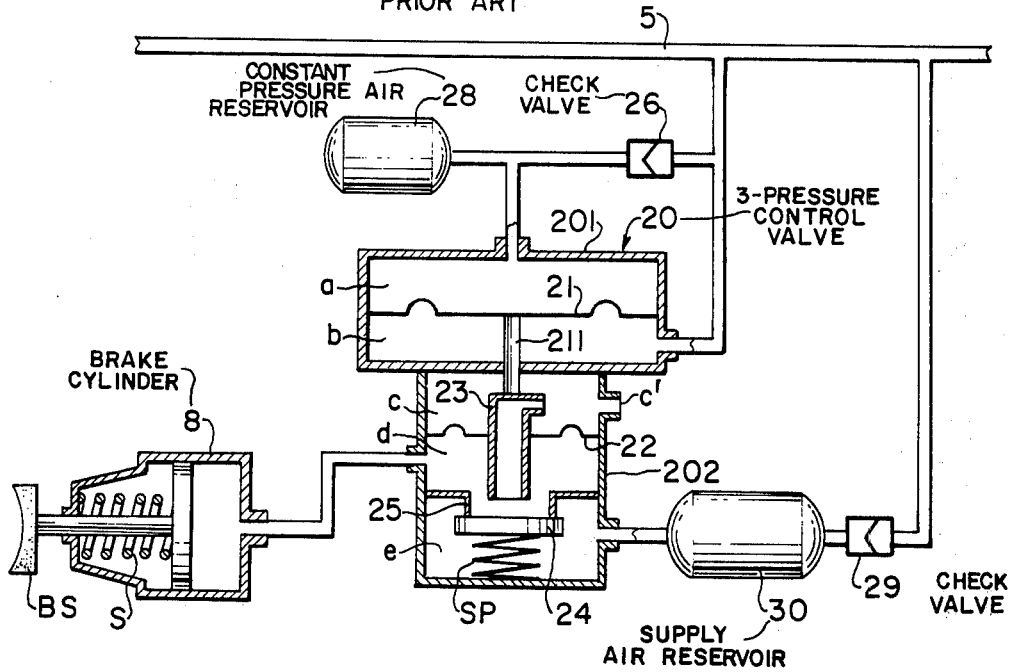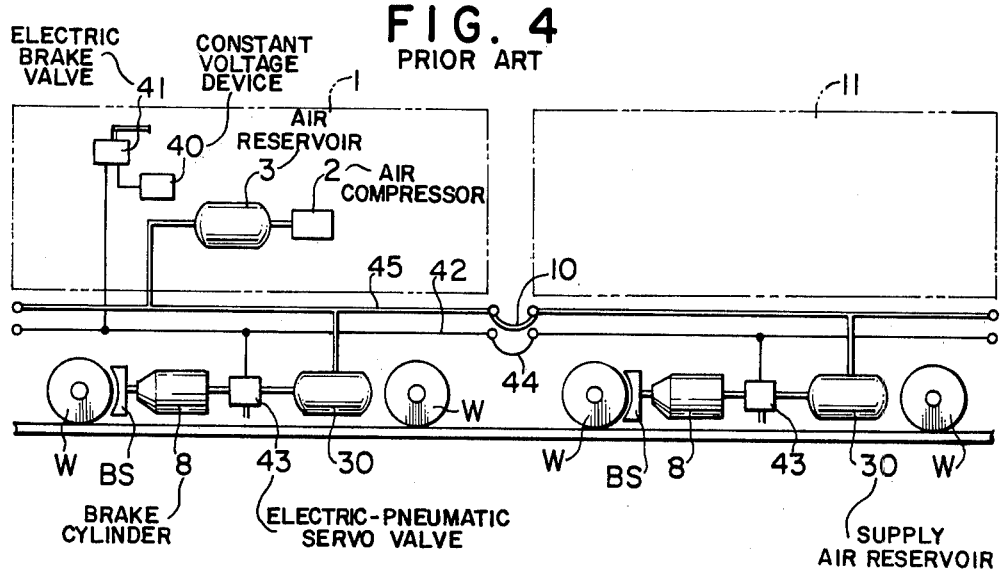

AIR BRAKE SYSTEM EMPLOYING COMBINED AUTOMATIC AND DIRECT BRAKING

BACKGROUND OF THE INVENTION

An automatic brake system is the conventional widespread means for braking a locomotive-hauled train of passenger coaches or cars. The automatic brake system enjoys widespread use by virtue of the fact that it is structurally simple, that it can transmit the braking order relatively fast, and in the event of the vehicles of the train being separated from one another in an accident, that it can automatically apply the brakes of the entire train. Meanwhile, increased train speeds and the introduction of automatic train control systems or automatic train operation systems raise the demand for better equipment than the conventional automatic brake system. Meeting this demand, a brake system primarily based on electric control or a direct-acting brake system coupled therewith has been made practically available. It is well known that when a vehicle is equipped with direct-acting brakes, it is necessary to provide an electrical braking order line in addition to the main air reservoir pipe in the longitudinal direction of the train. This system has the drawback that the brake will not work when the vehicles constituting the train are separated from one another. For this reason it has been considered necessary to provide an automatic brake system as a backup system when a vehicle is equipped only for direct-acting braking, and also it has been considered necessary to provide the automatic brake system in a vehicle equipped only for the direct-acting braking when a vehicle equipped only for the automatic braking is mixed in a train. In such case, however, two parallel piping systems have to be provided in the train, that is, the main air reservoir pipe for direct braking and the brake pipe for automatic braking.

These air pipes must necessarily be connected or disconnected together when the vehicles are coupled or uncoupled. This requires a substantial amount of time and labor, particularly in the case of a train which needs frequent shunting.

SUMMARY OF THE INVENTION

With the above discussion in mind, it is an object of the present invention to avoid waste of time and labor through manpower saving and simplification of facilities for such train shunting operations by providing a single air pipe which serves both as the brake pipe for automatic braking and as the main air reservoir pipe for direct braking in a vehicle equipped for both automatic braking and direct braking.

A further object of the present invention is to provide a brake system which can satisfactorily function as the direct-acting brake when direct braking alone is applied on the train, and which can immediately apply automatic braking when the air pipe happens to be disconnected as the result of the vehicles of the train being separated while direct braking is being applied.

A still further object of the present invention is to provide a brake system whereby the actions of automatic braking can take place satisfactorily even when a vehicle or vehicles equipped only for automatic braking are mixed in a train of vehicles hauled by a locomotive equipped according to the present invention.

The present invention provides an air brake system for a vehicle equipped for both automatic braking and direct braking, the equipment for direct braking being such that it requires the installation of a main air reservoir pipe in the longitudinal direction of a train. A single pipe serves both as the brake pipe for automatic braking and as the main air reservoir pipe for direct braking.

In this invention, a control valve for automatic braking is connected to the single air pipe via a pressure-adjust valve for adjusting the pressure of air supplied to the control valve to a specified value and via a check valve arranged parallel thereto. An air pipe supplying air from the control valve to the brake cylinder and an air pipe supplying air from the direct brake equipment to the brake cylinder are respectively connected to the brake cylinder via a double check valve.

In the present invention it is desirable that a main air reservoir installed on a braking order vehicle be connected to the brake valve for automatic braking via a pressure-adjust valve for adjusting the pressure of the air from the main air reservoir. The main air reservoir and the brake valve with the pressure-adjust valve are connected to the air pipe via a changeover switch such as a two-way cock. An electric brake valve for direct braking is connected or disconnected to a braking order line via a switch interlocked with the changeover switch.

The automatic brake system is simple in structure, and it can automatically apply braking to the entire train in the event of the vehicles of a train becoming separated from one another. Due to this desirable feature, the automatic brake system may be provided on railway vehicles as a means for stop braking or as a backup safety system. Presently available automatic brake system are classified as a two-pressure type or a three-pressure type, depending on the control valve provided on the vehicle.

BRIEF DESCRIPTION OF THE DRAWINGS

Other objects, features and advantages of the present invention will become apparent from the following detailed description taken in conjunction with the attached drawings, wherein:

FIG. 3 is a detailed schematic piping diagram of a conventional three-pressure control valve;

FIG. 4 is a schematic piping and wiring diagram of a conventional direct-acting brake system:

DETAILED DESCRIPTION OF THE INVENTION

Figure 1:
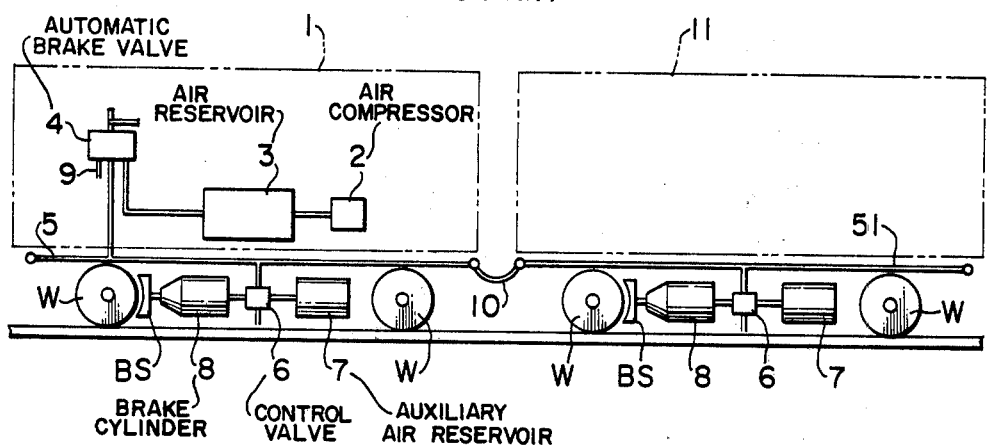
FIG. 1 is a schematic piping diagram of a conventional automatic brake system using a two-pressure air control valve.

With reference to FIG. 1, which illustrates a conventional two-pressure type system, there is shown a locomotive 1, an air compressor 2 which is the supply source of the compressed air for air braking, and an air reservoir 3 for storing the compressed air from air compressor 2 at a specified range of pressures. A brake valve 4 serves, when operated by the train crew, to supply the compressed air from the air reservoir 3 to a brake pipe 5 extending in the longitudinal direction beneath the vehicle body, or to discharge the compressed air in the brake pipe 5 through the exhaust pipe 9 to the atmosphere. Thus, the pressure of the compressed air in the brake pipe 5 may be increased or decreased by operation of the brake valve 4.

Figure 2:
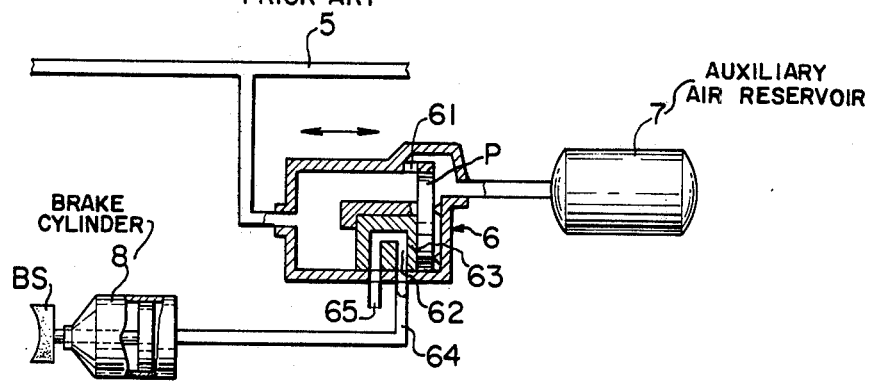
FIG. 2 is a detailed piping diagram of the two-pressure control valve shown in FIG. 1.

As shown in FIG. 2, when the air pressure in the brake pipe 5 is increased, the piston p, which is reciprocably movable as shown by the arrow within a control valve 6, is displaced to the right as shown in FIG. 2, and air from the brake pipe 5 charges an auxiliary air reservoir 7 through a gap 61 provided between the piston p and valve cylinder. At the same time, the open end of an air passage 64 of brake cylinder 8 communicates with one open end of an air passage 62 formed in a slide valve 63 fitted to the piston p, and air is discharged to the atmosphere through an exhaust hole 65 at a second end of the air passage 62.

When the air pressure in brake pipe 5 is reduced, the piston p moves to the left. When the piston p moves to the left until its end face contacts the opposite face of the control valve 6 and until the piston p is located between the air passage 64 and the exhaust hole 65, the compressed air in the auxiliary air reservoir 7 is supplied to the brake cylinder 8 through air passage 64.

An air brake hose 10 connects the brake pipe 5 of the locomotive to the brake pipe 51 of the vehicle 11 coupled to the locomotive. Pipe 51 has the same structure and arrangement as the brake pipe 5. Wheels W and brake shoes BS are operated by the brake systems. Vehicle 11 is equipped with a control valve, an auxiliary air reservoir and a brake cylinder of the same structure and function as those of the locomotive.

Under this arrangement, when the operation of the brake valve 4 causes a decrease in the air pressure of the brake pipes 5, 51 — which extend throughout the length of the train, the control valve 6 in each of the vehicles of the train acts to supply compressed air from the respective auxiliary air reservoirs to the respective brake cylinders 8 to cause the respective brake shoes BS to brake on the respective wheels W. When the air pressure in the brake pipe 5 is increased, the air in the brake cylinders 8 is discharged to the atmosphere, whereby the brake shoes BS are released and the auxliary air reservoirs 7 are charged.

In the event of an accident in which the vehicles of the train are separated from one another, the air brake hose 10 is disconnected, whereupon the air in the brake pipes 5, 51 is discharged to the atmosphere and the air pressure in the brake pipes 5, 51 is lowered to apply braking on the whole train.

FIG. 3 illustrates a three-pressure control valve of a three-pressure type automatic brake system. Between a three-pressure type automatic brake system and a two-pressure type automatic brake system, the construction of the brake pipe 5 in each vehicle and the brake cylinder 8 is absolutely the same, the only difference being in the control valve system.

In FIG. 3, a three-pressure control valve 20 includes an upper chamber 201 and a lower chamber 202 formed as an integral unit. Within upper chamber 201 is a membrane or diaphragm 21 which is vertically displaceable in an airtight manner along the inside wall of upper chamber 201. Thus, upper chamber 201 is divided by membrane 21 into two compartments a and b. A constant pressure air reservoir 28 is charged with compressed air from the brake pipe 5 via a check valve 26, such compressed air constantly acting on the compartment a. The compressed air in the constant pressure air reservoir 28 is prevented from flowing back toward the brake pipe 5 by check valve 26, and the internal pressure of reservoir 28 is normally held at, e.g. approximately 5 kg/cm², i.e. the standard pressure in the brake pipe. On the opposite inside wall at the bottom of the lower chamber 202 there is provided a valve seat 25. A valve plate 24 provided at the base of the lower chamber 202 is urged by a spring SP and is dimensioned to seal against valve seat 25. Above valve seat 25 in the lower chamber 202 is provided a membrane or diaphragm 22 which moves vertically in an airtight manner along the inside wall of the lower chamber 202. Thus, the lower chamber 202 is divided into compartments c, d and e by membrane 22, valve seat 25 and valve plate 24. Extending in an airtight manner through the midpoint of membrane 22 is a charge-discharge valve rod 23. The top side of charge-discharge valve rod 23 and the bottom side of membrane 21 are connected to each other via a connecting piece 211. The upper chamber 201 and the lower chamber 202 are airtightly separated. A supply air reservoir 30 is charged via a check valve 29 with compressed air from the brake pipe 5. The output from reservoir 30 leads to the compartment e of the lower chamber 202. The brake cylinder 8 communicates with the compartment d, while the compartment c communicates with the atmosphere via a discharge hole c'.

Under such arrangement, when the brake pipe 5 is charged, the pressure of the constant pressure air reservoir 28 is transmitted to the compartment a, while the compressed air in the brake pipe 5 is supplied to the compartment b. In this state, the pressure of the compressed air in the air reservoir 28 and the brake pipe 5 is equal, and membrane 21 is held in an idle position indicated in FIG. 3. The membrane 22 coupled to valve rod 23 and thus to membrane 21 via the connecting piece 211 is also in the indicated inoperative position. The bottom end of the charge-discharge valve rod 23 attached to membrane 22 is separated by a specified gap from the top side of the valve plate 24 which is urged to close the valve seat 25 by the force of the spring SP. Therefore, with the compressed air in the brake cylinder 8 discharged into the atmosphere via the compartment d, the charge-discharge valve rod 23 and the discharge hole c', the brake is released. When the operation of the brake valve 4 causes a decrease in the air pressure of the brake pipe 5, the air pressure in compartment a remains constant, but the air pressure in compartment b drops, thus causing the membrane 21 to lower as a result of pressure balance being lost between the compartments a and b. At the same time, the charge-discharge valve rod 23 connected to the membrane 21 and the membrane 22 also lowers, whereupon the tip of charge-discharge valve rod 23 contacts the top side of valve plate 24, thereby breaking the communication between compartment d and the discharge hole c'. With a further lowering of the charge-discharge valve rod 23, the valve plate 24 is pressed downwardly, overcoming the force of the spring SP, and as a result communication between the compartments d and e is established. In this condition the compressed air in the supply air reservoir 30 passes to the brake cylinder 8 via the compartments e and d, thereby causing a braking action. When the internal pressure of the brake cylinder 8 is increased as a result of the compressed air being supplied to the brake cylinder 8 from the supply air reservoir 30, the pressure in the compartment d also rises, thereby pushing up the membrane 22 and the charge-discharge valve rod 23 as well. When a balance is reached among the downward pressure on the membrane 21 by the compressed air in compartment a, the upward pressure on the membrane 22 by the compressed air in compartment d, the pressure of compartment e acting on the valve plate 24, and the force of the spring SP, the valve plate 24 moves into contact with the valve seat 25, thereby breaking the communication between the supply air reservoir 30 and the compartment d.

When the pressure in the brake pipe 5 is increased to release the brake, a pressure rise occurs in compartment b and in consequence the membrane 21 together with the charge-discharge valve rod 23 moves upwardly, whereupon the lower end of the charge-discharge valve 23 separates from the valve plate 24, thus causing the compartment d and the discharge hole c' to be in communication. With the compressed air in the brake cylinder 8 thus discharged to the atmosphere, the brake is released. In this case, if the pressure in the brake pipe 5 is increased to the standard value, the pressure will become balanced between the compartments a and b, and the membrane 21 as well as the charge-discharge valve rod 23 connected therewith will be in an idle condition. As a result, the pressure in the compartment d will continue to push the charge-discharge valve rod 23 until it becomes equal to atmosphere pressure, thereby fully releasing the brake. If however, the pressure in the brake pipe 5 fails to be restored to the standard value and the pressure rise is stopped midway, a residual pressure equivalent to the pressure difference between the compartments a and b will occur in the compartment d, this condition being referred to as the so-called "stepped release".

The supply air reservoir 30, the internal pressure of which has dropped as a result of the compressed air being supplied to the brake cylinder 8, is again charged via the check valve 29 when the pressure rises in the brake pipe. Thus, in the automatic brake system using a three-pressure control valve, the actions of the brake are dependent on the balance among the three pressures of the brake pipe, the constant pressure air reservoir and the brake cylinder.

As is apparent from the above, the automatic brake system has the advantages in that the structure of the control valve is relatively simple and that the brake acts automatically when a vehicle of a train happens to be separated. However, with the recent increases in speeds of trains, the following inconveniences have come to be revealed even with such automatic brake system.

In an automatic brake system wherein the operation of a brake valve installed on the leading vehicle causes a pressure drop in the brake pipe running through the train, thereby transmitting the braking force, the speed of the braking force being transmitted cannot exceed the velocity of sound, which fact has proved to be a major obstacle for a long train. Meanwhile, when the brake is applied immediately after being released, the braking performance is very poor due to the auxiliary air reservoir and the supply air reservoir being in an undercharged condition. Therefore, if the brake is frequently and continuously applied, an accident is liable to happen due to a drop in the braking force. For these reasons, the latest high-speed vehicles or electric railcars equipped for automatic train control are for the most part provided with a direct-acting brake. In direct-acting brakes it is indispensable, except with a genuine direct-acting which is applied to a single or very short train, e.g. of approximately only two vehicles, that a main air reservoir pipe be laid throughout the train. An electro-pneumatic brake is a typical example of a direct-acting brake.

In FIG. 4, the compressed air accumulated by air compressor 2 mounted on locomotive 1 is sent to a main air reservoir pipe 45 extending in the longitudinal direction of the train and from there is supplied to a supply air reservoir 30 which stores the compressed air for braking each vehicle in the train. An air brake hose 10 connects to the main air reservoir pipe of an adjoining vehicle. A constant voltage device 40 has the output thereof passes via a direct braking command element such as electric brake valve 41 to a braking order line 42 extending in the longitudinal direction of the train. Electric brake valve 41 is a variable transformer. A junction line 44 electriclaly connects to the braking order line of the adjoining vehicle. An electro-pneumatic servo valve 43 supplies compressed air from supply air reservoir 30 to brake cylinder 8 for the purpose of maintaining in the brake cylinder 8 compressed air at a pressure proportional to the voltage given to the braking order line 42, or alternatively discharges the compressed air in the brake cylinder 8 to the atmosphere. The coupled vehicle 11 is equipped with a supply air reservoir, an electro-pneumatic servo valve and a brake cylinder of the same function as those in the locomotive 1.

Under this arrangement, when the output voltage from the constant voltage device 40 is transformed to a specific voltage by the electric brake valve 41, and this specific voltage is given to the braking order line 42, such specific voltage is passed to the electro-pneumatic servo valve 43 of each vehicle. As a consequence, compressed air with a pressure based on the thus impressed specific voltage is supplied from the supply air reservoir 30 to the brake cylinder 8, thereby causing the brake shoe BS to act and the wheel W to be braked. When the impressed voltage on the braking order line 42 is made zero through the action of the electro-pneumatic brake valve 41, the compressed air in the brake cylinder 8 is discharged through the electro-pneumatic servo valve 43 to the atmosphere, thereby releasing the brake shoe BS.

In the above-mentioned direct-acting brake system, the braking order is electrically transmitted over the braking order line 42 extending throughout the length of the train. Thus, the transmission of an order takes place very rapidly, with the braking action simultaneously occurring in all vehicles. Further, since "charging" such as is necessary in an automatic brake system does not take place, there is no likelihood of the braking force dropping, even during frequent repetition of braking action, unless the pressure in the main air reservoir 3 and in the main air reservoir pipe 45 falls.

In the direct-acting brake system, however, there is the danger of the braking action failing due to the braking order line 42 and the main air reservoir pipe 45 being disconnected in the event of the vehicles of a train being separated.

Thus, it is common practice to equip a vehicle also with an automatic brake system as a backup device even when the vehicle is equipped with a direct-acting brake, to achieve better and safer braking performance. In such case, however, it is necessary to provide in the longitudinal direction of the train two pipes; i.e. the brake pipe for automatic braking and the main air reservoir pipe for direct braking, since it is indispensable, even when using a direct-acting brake system other than the above-mentioned electro-pneumatic brake system, to provide in the longitudinal direction of the train a main air reservoir pipe to supply the compressed air for braking.

These air pipes, together with the couplers therefor, have to be connected or disconnected every time vehicles are coupled or uncoupled. Considerable time and labor are involved for connection and disconnection of these pipes in a train needing frequent shunting.

To eliminate the above inconveniences of vehicles equipped with both the automatic brake system and the direct-acting brake system, the present invention provides an arrangement such that only a single air pipe runs through the train. Such single air pipe serves concurrently as the brake pipe for automatic braking and as the main air reservoir pipe for direct braking.

For this purpose it must be assured that:

1. when the direct-acting brake is operating, the proper functioning of such system can be insured, but that when the single air pipe is disconnected due to vehicles in the train being separated, the automatic brake can immediately be put into operation; and
2. when the direct-acting brake fails, and the automatic brake alone is to be operated, or that when a vehicle equipped with no direct-acting brake is coupled to the train, the automatic brake can properly function.

Usually the standard pressure in the brake pipe of an automatic brake system is set at approximately 5 kg/cm$^2$ for normal operation, while the air pressure in the main air reservoir (hereafter referred to as "MR pressure") of the direct-acting brake is slightly higher, i.e. over 7 kg/cm$^2$. Since the brake pipe of the automatic brake system is charged from the brake valve of the order vehicle (hereafter referred to as the "leading vehicle") via the pressure-adjust valve, the pressure in such brake pipe can be kept constant in normal operation. By contrast, the main air reservoir pipe of the direct-acting brake is supplied directly with compressed air from the main air reservoir, the pressure of which is continuously changing with the operation of the air compressor on the locomotive and the consumption of the air.

Accordingly, in the case of a single air pipe serving as the brake pipe, in the systems of FIG. 1 and FIG. 3 respectively showing a two-pressure control valve and a three-pressure control valve, when the pressure in the brake pipe changes, the pressure in the brake pipe rises once to a certain value and then a pressure drop occurs, i.e. the brake pipe is charged and thereafter the brake is worked. This is the same condition as occurs when the air in the brake pipe is decreased. It is obvious from the structure of the two-pressure or three-pressure control valves illustrated in FIG. 2 and FIG. 3, that in the common automatic brake system with the brake pipe normally at a standard pressure of 5 kg/cm$^2$, even when the brake pipe is charged to a pressure higher than 5 kg/cm$^2$ and the pressure is then lowered, the braking action will take place in just the same way as when the pressure is lowered from a value of 5 kg/cm$^2$. Accordingly, when the brake pipe and the main air reservoir pipe are jointly used, the automatic brake acts to decrease the train speed, regardless of the driver's intention, through a pressure change in the single air pipe serving as the main air reservoir pipe, even if the driver does not operate the automatic brake system.

To avoid such an occurrence, the main air reservoir pipe has only to be designed such that it can be continuously maintained at a specified pressure. When the air volume supplied to a long train with many vehicles is continuously changing, it will be difficult to maintain the pressure in the main air reservoir at a constant value, no matter how excellent the supply performance of the air compressor may be. When the pressure in the single air pipe is set higher than the standard pressure in a common brake pipe, and this air pipe is employed as the brake pipe, the force of the brake cylinder will be remarkably higher than the force under normal charge if the brake acts by a reduction in pressure from the overcharged state of the brake-pipe. Thus, damage may be done to the brake shoe or to the wheel tread, or the wheels may develop skidding, because under overcharge of the brake pipe the pressure in the auxiliary air reservoir to store the compressed air to be supplied to the brake cylinder and in the supply air reservoir will exceed the standard pressure, and the thereby excessively compressed air will act on the brake cylinder during a braking action.

Figure 5:
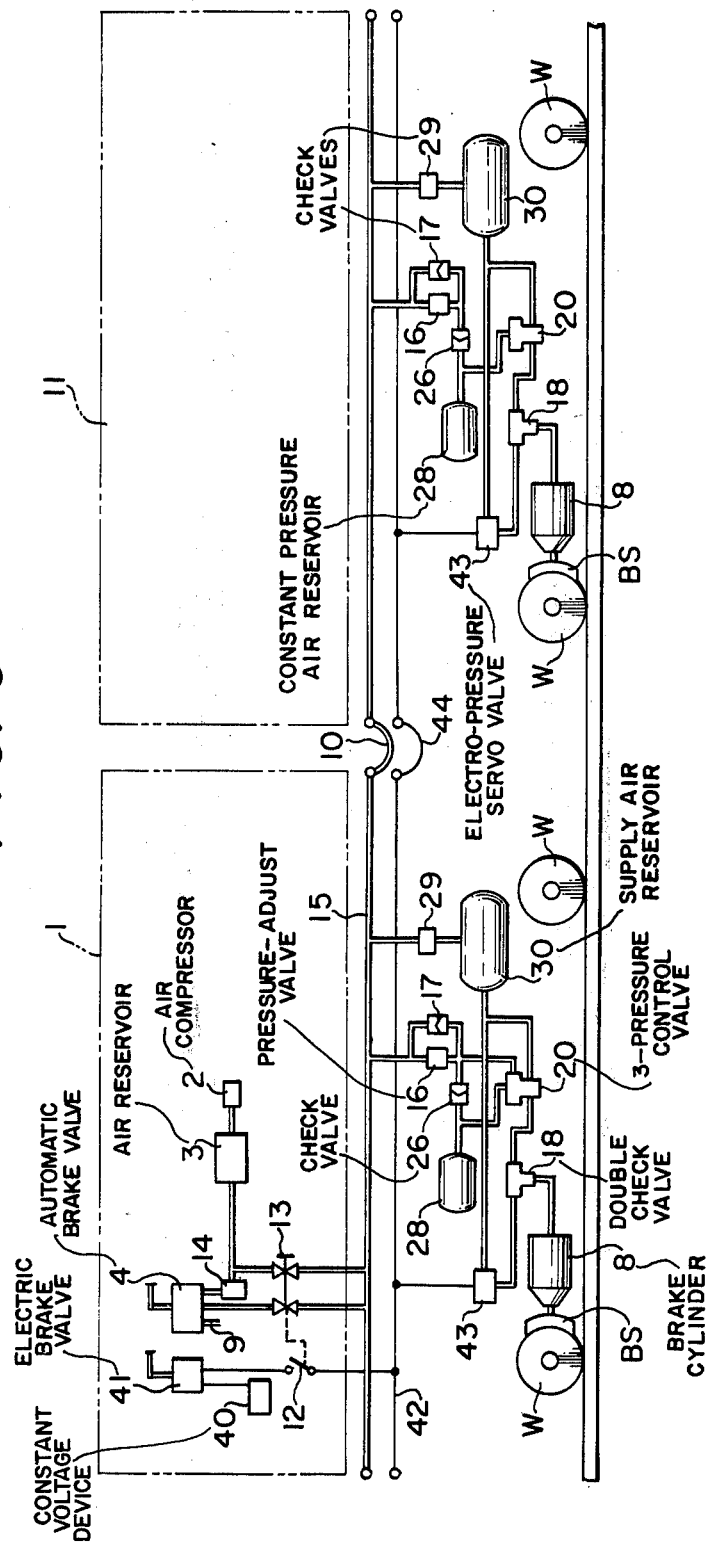
FIG. 5 is a schematic piping and wiring diagram of a first embodiment of the present invention.
Figure 6:
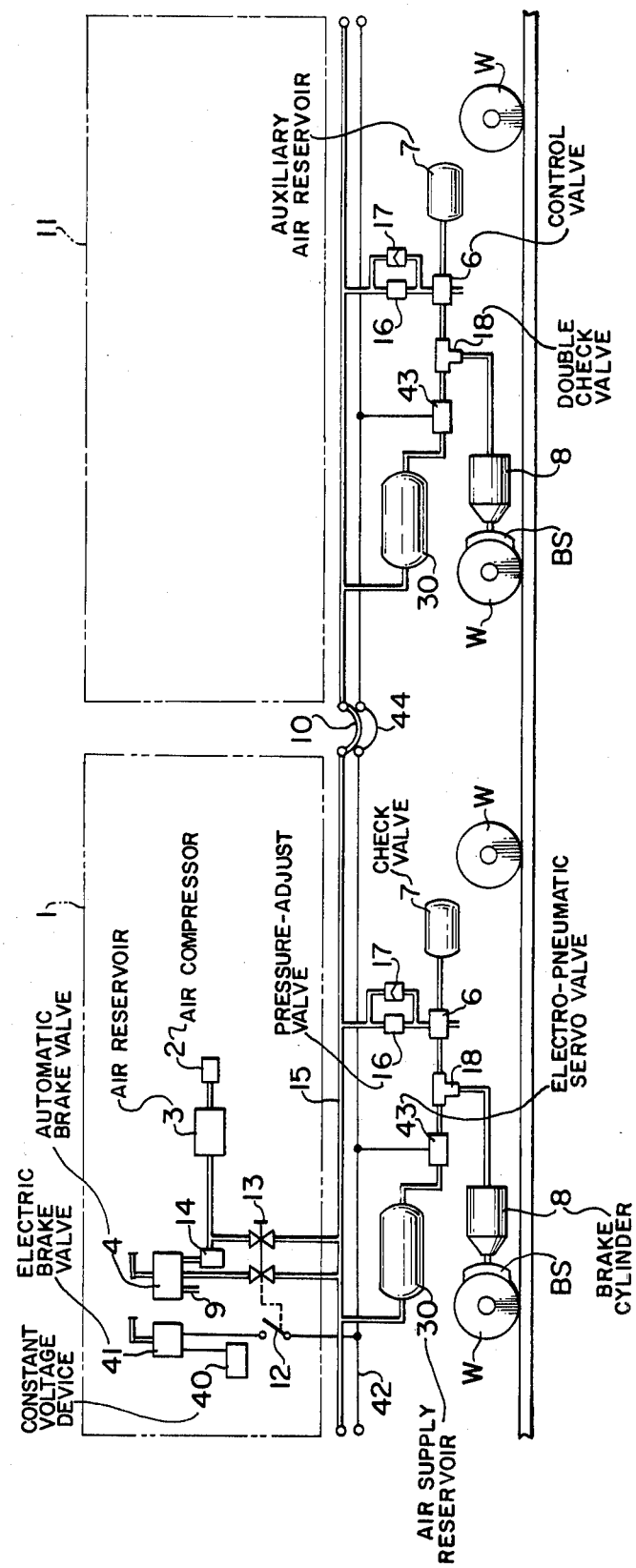
FIG. 6 is a schematic piping and wiring diagram of a second embodiment of the present invention.

These disadvantages can be easily eliminated by the present invention, a detailed description thereof being now given with reference to FIGS. 5 and 6.

FIG. 5 illustrates an automatic brake system using a three-pressure control valve. In FIG. 5, similar reference numerals denote the same elements as shown in FIGS. 1–4. A single air pipe 15 serves concurrently as the brake pipe for automatic braking and as the main air reservoir pipe for direct braking. Air pipe 15 is connected between vehicles by means of an air brake hose 10 and extends in the longitudinal direction of the train. A pressure-adjust valve 14 serves to adjust the variable pressure compressed air stored in the main air reservoir 3 to a specific pressure, e.g. 5 kg/cm$^2$, and to supply it to the brake valve 4. A two-way cock 13 provides for switching between the automatic brake and the electro-pneumatic brake. A switch 12 is provided for the electro-pneumatic brake. A pressure-adjust valve 16 for control valve 20 prevents the compressed air supplied from the air pipe 15 to the compartment b of a three-pressure control valve 20 and the constant pressure air reservoir 28, the details of which are shown in FIG. 3, from exceeding the standard pressure of the compressed air supplied from the brake pipe under application of the automatic brake. Thereby, it can be avoided that the three-pressure control valve 20 and the constant pressure air reservoir 28 fall into an overcharged condition upon application of the electro-pneumatic brake, since during direct braking the air pipe 15 is supplied with compressed air directly from the main air reservoir 3 at a pressure higher than the standard pressure of the brake pipe for automatic braking, but the pressure of such compressed air is adjusted to the standard pressure of the brake pipe by the action of the pressure-adjust valve 16. A check valve 17 for control valve 20 will open only in the direction from the compartment b of the three-pressure control valve 20 in FIG. 3 toward the air pipe 15, the function of check valve 17 being to transmit a posible pressure drop in the air pipe 15 to the three-pressure control valve. If check valve 17 were not provided, the three-pressure control valve 20 would not be able to detect a pressure drop in the air pipe 15, since the valve 16 provided between the air pipe 15 and the compartment a of the three-pressure control valve 20 in FIG. 3 is not open in the direction from the three-pressure control valve 20 toward the air pipe. A pressure-adjust valve 29 for supply air reservoir 30 functions to prevent an overcharged state by properly adjusting the pressure of the compressed air to a pressure higher than the standard pressure 5 kg/cm$^2$ at which the compressed air is supplied from the main air reservoir 3 to the air pipe 15. A double check valve 18 connects the compartment d of the three-pressure control valve 20 in FIG. 3 to the output side of the electro-pneumatic servo valve 43, whereby when from either of these two valves double check valve 18 is charged or discharged, such double check valve operates such that the brake cylinder 8 may be charged with or discharged of the respectively compressed air.

The coupled vehicle 11 is also equipped with a brake system of the same function as that on the locomotive 1.

With this arrangement, when the electropneumatic brake is to be opeated on the train, the two-way cock 13 is moved directly connect the main air reservoir 3 with the air pipe 15 and to disconnect the air pipe 15 from the brake valve 4. At the same time the switch 12 for electro-pneumatic braking is closed.

When a variable voltage is impressed from a power source (not shown) to the braking order line 42 via the electric brake valve 41, the electro-pneumatic servo valve 43 in every vehicle acts simultaneously to supply in a known manner a compressed air, dependent on such impressed voltage, from the supply air reservoir 30 to the brake cylinder 8 via the electro-pneumatic servo valve 43 and the double check valve 18, whereupon the brake shoe BS is applied to brake the wheels W. When the impressed voltage on the braking order line 42 is rendered zero by the action of the electric brake valve 41, the air in the brake cylinder 8 is discharged from the electro-pneumatic servo valve 43 to the atmosphere via the double check valve 18, whereupon the brake shoe BS is released. In the meantime, the automatic brake is in a released position, because the compartment b of the three-pressure control valve 20 is charged from the air pipe 15 which is supplied with compressed air from the main air reservoir, and the compartment a is charged from the constant pressure air reservoir 28, with the compressed air at a pressure adjusted by the pressure-adjust valve 16 for control valve 20 to the standard value 5 kg/cm$^2$. In case the air pipe 15 is broken in a train separation accident and the compressed air in such pipe suddenly leaks to the atmosphere, the compressed air which has charged compartment b of the three-pressure control valve 20 is discharged to the atmosphere through the check valve 17 and the air pipe 15, whereupon the three-pressure control valve 20 swiftly moves into a braking position to back up the braking action.

When the automatic brake is to be operated, the two-way cock or valve 13 is moved to connect the brake valve 4 to the air pipe 15 and to disconnect at the position of two-way cock 13 the main air reservoir 3 from the air pipe 15. At the same time, the switch 12 for electro-pneumatic braking is opened. Thereupon the air pipe 15 is supplied from the main air reservoir 3 with a compressed air adjusted by the pressure-adjust valve 14 to the standard pressure, e.g. 5 kg/cm$^2$, while the pressure in the air pipe 15 is increased or decreased by discharging the compressed air therein to the atmosphere through the exhaust pipe 9. Then, since the construction of the automatic brake in FIG. 5 is absolutely the same as that in FIG. 3, in the same manner as described with reference to FIG. 3 the three actions of the automatic brake can take place, since the air pipe 15 in FIG. 5 corresponds to the brake pipe 5 in FIG. 3, while the three-pressure control valve 20, the constant pressure air reservoir 28, the supply air reservoir 30 and the brake cylinder 8 are all of the same construction and layout as those in FIG. 5.

In FIG. 5 there appear upon application of automatic braking certain items not appearing in FIG. 1 and FIG. 3, but these do not substantially effect the functioning of the automatic brake using a three-pressure control valve 20, since the electro-pneumatic valve 43 can never act with no voltage impressed on the order line 42. The pressure adjust valve 16 for the control valve and the check valve 17 for the control valve, which are provided for the purpose of preventing overcharging of the air pipe 15 under application of electro-pneumatic braking with a variable pressure compressed air directly supplied from the main air reservoir 3, have no effect in a non-overcharged state, i.e. when the air pipe 15 is serving as the brake pipe.

On the other hand, even when a vehicle equipped only for automatic braking is coupled to a vehicle hauled by a locomotive equipped according to the present invention, braking by the automatic brake can take place if the air pipe is connected to the brake pipe of the coupled vehicle, since the braking force is controlled by the locomotive through the air pipe 15. And even when a vehicle equipped according to the present invention is coupled to a locomotive equipped only for automatic braking, for the same reason as described above, braking by the automatic brake can take place.

With reference now to FIG. 6, an example of an automatic brake using a two-pressure control valve will be described. In FIG. 6 similar reference symbols denote the same elements as used in FIGS. 1, 4 and 5. When the train is to be supplied with an electro-pneumatic brake which is a direct-acting brake, the two-way cock 13 is operated to directly connect the main air reservoir 3 to the air pipe 15 and to disconnect the brake valve 4 from the air pipe 15, whereupon the air pipe 15 is supplied with compressed air at a pressure higher than the standard pressure of 5 kg/cm$^2$. Meanwhile, the switch 12 is closed by being interlocked with cock 13, and a variable voltage is ready to be impressed on the order line 42 through the electric brake valve 41. The supply air reservoir 30 is supplied from the air pipe 15 with compressed air from the main air reservoir 3. When the electric brake valve 41 is operated to impress a voltage on the order line 42, compressed air proportional to the impressed voltage passes from the supply air reservoir 30, via the electro-pneumatic servo valve 43 and the double check valve 18 to the brake cylinder 8, causing braking action of the brake shoe BS. When the impressed voltage is rendered zero, the compressed air in the brake cylinder 8 is discharged from the electro-pneumatic servo valve 43, via the double check valve 18, to the atmosphere, thus releasing the brake shoe BS. Thus, the same braking action as shown in FIG. 4 can be performed.

In the event of a train separation accident in which the compressed air in the air pipe 15 is discharged, a pressure drop in the control valve 6 connected to the air pipe 15 occurs through the check valve 17 and consequently the brake acts swiftly.

When the automatic brake is to be applied, in the same way as mentioned with reference to FIG. 5 the two-way cock 13 is turned to the automatic brake side, while the electro-pneumatic brake switch 12 is opened due to interlocked connection with cock 13. Action of the brake valve 4 causes the pressure-adjust valve 14 to adjust the compressed air of the main air reservoir to the standard pressure of the brake pipe, i.e. approximately 5 kg/cm$^2$, and such compressed air is then supplied via the brake valve 4 to the air pipe 15.

By decreasing or increasing the pressure of compressed air in the air pipe 15 under this condition, the actions of the automatic brake can take place in just the same way as with the automatic brake illustrated in FIG. 1. Namely, the air pipe 15 in FIG. 6 corresponds to the brake pipe 5 in FIG. 1, while the control valve 6, the auxiliary air reservoir 7, and the brake cylinder 8 in FIG. 5 are respectively of the same construction and layout as those in FIG. 1. Accordingly, depending on a rise or fall of the pressure in the air pipe 15, the actions of the automatic brake take place by the action of the control valve 6. In FIG. 6 there appear certain elements not appearing in FIG. 1, but these do not substantially alter the actions of the automatic brake by the control valve 6, since the electro-pneumatic servo valve 43 cannot act in the absence of any voltage on the order line 42, while the pressure-adjust valve 16 and the check valve 17, which are provided for the purpose of preventing the air pipe 15 from being overcharged with variable pressure compressed air which is directly supplied from the main air reservoir 3 during direct braking, cannot make any action affecting the action of the automatic brake when the air pipe is serving as the brake pipe. It goes without saying that also in the embodiment of FIG. 6, as mentioned with reference to FIG. 5, the actions of the automatic brake can take place satisfactorily even when a vehicle or vehicles equipped only for automatic breaking are mixed in a train of vehicles hauled by a locomotive equipped according to the present invention.

As is apparent from the above, the present invention eliminates the above mentioned problems caused when the brake pipe for automatic braking and the main air reservoir pipe for direct braking are jointly connected by a single air pipe, and accordingly it eliminates the necessity of connecting or disconnecting two pipes when vehicles equipped for both automatic and direct braking are to be coupled. Moreover, the present invention permits the satisfactory action of the automatic brake, even when a locomotive or a vehicle or vehicles equipped only for automatic braking are mixed in a train. Thus, the technical advantages of the present invention are indeed significant.

The above description deals with a braking acting order being issued only electrically using an electro-pneumatic servo valve. However, the scope of the present invention also encompasses the use of any other type of direct-acting brake wherein it is indispensable that the main air reservoir pipe of the leading vehicle run throughout the length of the train.

What is claimed is:
1. In an air brake system for plural coupled vehicles such as trains, said system being of the type wherein each said vehicle has a brake applying cylinder movable between a brake applying position and a released position, said system further being of the type including both an automatic braking means for achieving a brake applying position in response to a decrease in air pressure and a direct braking means for achieving a brake applying position in response to a direct braking order, the improvement comprising:
an air reservoir;
a single air pipe extending longitudinally of said vehicles, said single air pipe comprising both a brake pipe for said automatic braking means and a main air reservoir pipe for said direct braking means;
first air passage means for supplying air from said air reservoir directly to said single air pipe;
second air passage means for supplying air from said air reservoir to said single air pipe, separately from said first air passage means, said second air passage means including an automatic braking valve for selectively increasing or decreasing the air pressure in said single air pipe, said second air passage means further including pressure-adjust valve means for regulating the pressure of air passing through said automatic braking valve to a predetermined value;
said first and second air passages being alternately operable to communicate said air reservoir with said single air pipe;
an electric brake valve;
each vehicle having storage reservoir means, connected to said single air pipe, to supply air to the respective said braking cylinder to move said braking cylinder to the brake applying position thereof;
each vehicle having an automatic braking control valve means, connected to said single air pipe, for supplying air from the respective said storage reservoir means to the respective said braking cylinder in response to a decrease in pressure in said single air pipe, to thereby initiate an automatic braking operation;
each vehicle having an electro-pneumatic servo valve means, electrically coupled to said electric brake valve and pneumatically coupled to the respective said braking cylinder and the respective said storage reservoir means, for supplying air from the respective said storage reservoir means to the respective said braking cylinder in response to a command from said electric brake valve, to thereby initiate a direct braking operation;
an electric switch connected between said electric brake valve and each said servo valve for interrupting connection therebetween; and
a double valve means for selectively opening said first passage means and closing said second passage means or alternatively closing said first passage means and opening said second passage means, said electric switch being coupled to said double valve means to be closed when said first passage means is open and to be opened when said first passage means is closed;
whereby automatic braking will occur upon separation of said vehicles and opening of said single air pipe, even if the system is operating under the direct braking mode.

2. The improvement claimed in claim 1, further comprising second pressure-adjust valve means, positioned between said single air pipe and said automatic braking control valve means, for regulating the pressure of air supplied to said control valve means to said predetermined value, and check valve means, positioned between said single air pipe and said control valve means in parallel with said second pressure-adjust valve means, for communicating a pressure drop in said single air pipe to said control valve means.

3. The improvement claimed in claim 1, wherein said automatic braking control valve means comprises a two-pressure control valve, said storage reservoir means comprises an auxiliary air reservoir and a supply air reservoir, said control valve having a piston movable to a braking position upon a decrease in pressure in said single air pipe and to a non-braking position upon an increase in pressure in said single air pipe, said auxiliary air reservoir communicating through said control valve with said braking cylinder when said control valve piston is in said braking position, said auxiliary air reservoir communicating through said control valve with said single air pipe when said control valve piston is in said non-braking position, and said supply air reservoir communicating with said braking cylinder through said servo valve.

4. The improvement claimed in claim 1, wherein said automatic braking control valve means comprises a three-pressure control valve, and said storage reservoir means comprises a supply air reservoir connected to said single air pipe, said control valve having a valve member movable to a braking position upon a decrease in pressure in said single air pipe and to a non-braking position upon an increase in pressure in said single air pipe, said supply air reservoir communicating through said valve member with said braking cylinder when said valve member is in said braking position, and said supply air reservoir communicating with said braking cylinder through said servo valve.

* * * * *